May 13, 1952  C. V. ZIEG, JR  2,596,193
CENTRIFUGAL CLUTCH
Filed July 22, 1948

Inventor:
Clifford V. Zieg Jr.
Andrew F. Wintercorn
Atty.

Patented May 13, 1952

2,596,193

UNITED STATES PATENT OFFICE 2,596,193

CENTRIFUGAL CLUTCH

Clifford V. Zieg, Jr., Fort Wayne, Ind., assignor to Dana Corporation, Toledo, Ohio, a corporation of Virginia Application July 22, 1948, Serial No. 40,192

3 Claims. (Cl. 192—105)

This invention relates primarily to clutch mechanisms designed to engage automatically under centrifugal force, although it will soon appear that the present invention is useful either for clutch or brake applications, because the structure employed in the centrifugal clutch may, substantially without change, be used for a brake; and, with very little change, changed from a centrifugal clutch to a manually engageable and disengageable clutch.

One object of my invention is to provide a power transmission device, either clutch or brake, designed to be actuated by centrifugal force acting on two opposed shoes and having link means on both ends of each shoe for radially and circumferentially moving the shoes into contact simultaneously throughout their length with the inner periphery of a cooperating drum, which in the case of a brake is a brake drum and in the case of a clutch is the driven element. An important feature in connection with the operation of this power transmission device as a clutch is the so-called "servo" action, namely, initial clutch engagement causes a reaction upon the shoes in the direction of better clutch engagement.

Another object is to provide a device of the kind mentioned designed to be usable as a starting and power transmitting ratchet mechanism on the power receiving unit, like a motor bike, motor scooter, power mower, or the like, to drive the engine in starting, whereby to eliminate the necessity for a foot pedal or rope spinner starter.

The invention is illustrated in the accompanying drawing, in which—

Figure 1:
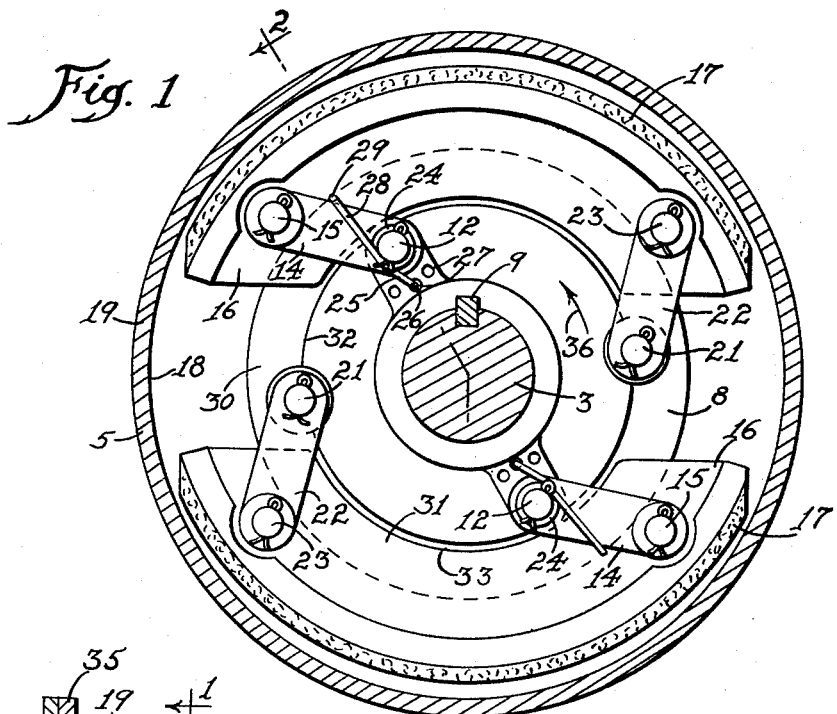
Figure 2:
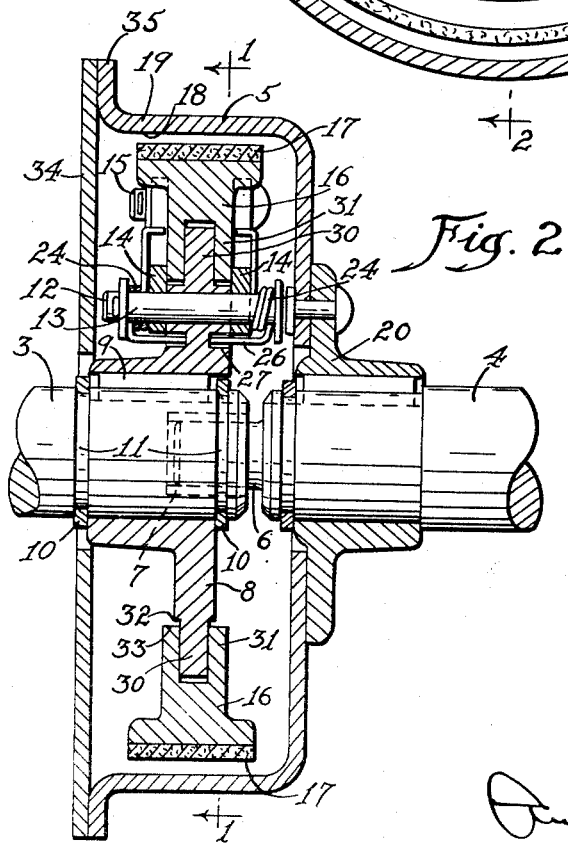

Fig. 1 is a sectional view of a power transmission device embodying my invention, taken on line 1—1 of Fig. 2, and Fig. 2 is a cross-section on the broken line 2—2 of Fig. 1.

The same reference numerals are applied to corresponding parts in these two views.

Referring to the drawing, the reference numerals 3 and 4 designate coaxially arranged driving and driven shafts, respectively, or vice versa, depending upon the particular application of the invention. In the case of a centrifugal clutch, in which application it is desirable to delay transmission of power until the power source has attained a predetermined speed, the shaft 3 is the driving shaft and 4 the driven shaft. However, in an application where the clutch mechanism serves as a starting and power transmitting ratchet mechanism on the power receiving unit, as, for example, in the case of a motor bike, motor scooter, power mower, or the like, where it is desired to have the driven mechanism drive the engine in starting, whereby to eliminate the necessity for a foot pedal or rope spinner starter and enable starting the engine with minimum load imposed thereon, the shaft 3 would be the driven shaft and 4 the power or driving shaft. Those are the principal applications, although, as has already been indicated, the mechanism of my invention is also usable as a brake mechanism, and in such an application the drum 5, which in a clutch application is the driven element, would serve as the brake drum. In the following description, however, the mechanism is described with a view primarily to its use for clutch applications.

The coaxially arranged shafts 3 and 4 are maintained in coaxial relation by the reduced pilot extension 6 on shaft 4 working in a bearing 7 in the end of shaft 3. 8 is a drive flange keyed, as at 9, on the end of shaft 3, and held against endwise displacement by split snap rings 10 engaging in annular grooves 11 provided in the end portion of shaft 3. Cross-pins 12 are received in holes 13 in the flange 8, and have links 14 pivoted at their inner ends on both ends of these pins, the outer ends being pivotally connected similarly to cross-pins 15 mounted in one end of the shoes 16. The latter have facings 17 thereon of a composition material, such as is used on clutch plates or brake shoes, and these facings are adapted to engage the inner periphery 18 of the annular wall 19 of the drum 5, which is drivingly connected with and mounted on the end of shaft 4, as shown at 20. Other cross-pins 21, similar to the pins 12, are mounted on the flange 8 in circumferentially spaced relation to the pins 12, and have links 22 pivotally connected at their inner ends to both ends of these pins, the outer ends of these links being similarly pivotally connected to the ends of other cross-pins 23 mounted in the other ends of the shoes 16. With this arrangement, the shoes 16 are movable circumferentially and radially relative to the flange 8 under centrifugal force when shaft 3 is turned at or above a predetermined speed. Coiled torsion springs 24 are mounted on both ends of the pins 12, and each has one tangentially extending end portion 25 anchored by its right angle bent end 26 in either one of three holes 27 provided therefor in the flange 8 in circumferentially spaced relation about the associated pin 12 as a center, the other tangentially extending end portion 28 of the spring having the right angle bent end 29 thereof hooked onto the associated link 14, tending to swing the same normally in a counter-clockwise direction. By changing the setting of the springs 24, as permitted by the holes 27, the shoes 16, which in the present structure serve the double function of drive shoes and flyweights, are caused to respond at different speeds. The outer peripheral edge portion 30 of the flange 8 is of reduced thickness, and the shoes 16, which are of arcuate form, are bifurcated on their inner circumference, as shown at 31, to slide on the reduced peripheral portion 30 of the flange with a free working fit. The annular shoulder 32 defined at the inner circumference of the reduced peripheral portion 30 is struck on the same radius as the inner peripheries 33 of the shoes 16, and the shoes when fully retracted are adapted to engage this shoulder as a limiting stop. The clutch mechanism is suitably enclosed by a plate 34 bolted, or otherwise suitably secured, at its outer peripheral edge portion to an outwardly projecting flange 35 provided on the drum 5.

In operation, assuming that the shaft 3 is driven by an internal combustion engine, for example, in the direction of the arrow 36 shown in Fig. 1, and it is desired to delay transmission of power until the engine (and shaft 3) has attained a predetermined speed, the two shoes 16 will move outwardly and circumferentially under centrifugal force for engagement of the clutch at the predetermined speed. It is important to note that a "servo" action occurs as soon as the facings 17 engage the inner circumference 18 of the drum 5, resulting in quicker and better engagement. The speed of the shaft 3 at which clutch engagement occurs depends, of course, upon the setting of the springs 24, these springs being shown in Fig. 1 as having a medium setting. Hence, if the end portion 25 of the springs is moved in a counter-clockwise direction to enter the right angle bent end 26 in the next hole 27, this further winding of the springs obviously necessitates turning the shaft 3 at a higher speed before automatic clutch engagement will occur, and contrarywise if the springs are adjusted in the other direction. The links 14 and 22 at opposite ends of each shoe, it will be observed, are identical and therefore interchangeable, which, of course, is a big advantage from the standpoint of economical manufacture. It also contributes towards evenness of wear on the shoe facings. When the ignition is turned off, or the engine is throttled down to a point where the springs 24 acting against the links 14 exert sufficient force to retract the shoes 16 against the diminished centrifugal force acting thereon, the clutch will, of course, be disengaged automatically. So long as the shoes 16 are transmitting drive to the drum 5 there is no likelihood of the clutch disengaging even if the speed drops considerably, bearing in mind the "servo" action mentioned above. However, if the engine is throttled down and the drum 5 overruns the clutch due to momentum of the driven mechanism, the shoes 16 will be disengaged immediately, because then it is purely a question of whether there is still enough centrifugal force acting on the shoes to overcome the inward pull of the springs 24.

The construction just described may be used without the springs 24 in a manually engaged and disengaged clutch, and it may also be employed as a brake mechanism.

In other applications of the invention, as, for example, on motor bikes, motor scooters, power mowers, and so forth, where the clutch mechanism serves the double purpose of transmitting drive as well as being the starter, the drum 5 is the driving element, the shaft 4 being the power shaft, and the shaft 3 being the driven shaft. Much lighter springs will ordinarily be used in such applications, because the clutch should engage automatically when the machine to be driven by power is run manually at a moderate speed, the engagement of the clutch causing the engine to be turned over and started, assuming, of course, that the ignition has been turned on.

It is believed the foregoing description conveys a good understanding of the objects and advantages of my invention. The appended claims have been drawn to cover all legitimate modifications and adaptations.

I claim:

1. A centrifugal clutch comprising, in combination with coaxially arranged shafts, one of which is a driving shaft and the other a driven shaft, a radially projecting annular drive transmitting flange on one of said shafts, the outer marginal portion of which is of reduced thickness whereby an annular shoulder is defined at the inner circumference of the reduced portion, a drive transmitting drum on the other of said shafts having a peripheral wall in concentric relation to said flange and surrounding the same, a pair of diametrically opposed clutch shoes which are elongated circumferentially relative to said drum and have bifurcated radially inner portions slidably guided on the reduced marginal portion of said flange, each shoe having an arcuate friction surface on the outer periphery for engagement with the peripheral wall of the drum and being of sufficient mass to serve as a flyweight for centrifugal actuation of the clutch, a pair of links at each end of each shoe pivotally connected at one end to the radially inner portion of the flange on the opposite sides thereof and at the other end to the end portions of the shoe on the opposite sides thereof to guide the shoe for radial and circumferential movement under centrifugal force, and spring means tending to return the shoes to retracted position in engagement with the aforesaid annular shoulder.

2. A centrifugal clutch as set forth in claim 1, wherein the spring means comprises coiled torsion springs surrounding the pivots for some of said links on said flange and having one end bearing against the links and the other end bearing on the flange, the springs having the ends that bear on the flange adjustable circumferentially with respect to the pivots on which said springs are mounted, whereby to vary the spring pressure active on the shoes.

3. A clutch as set forth in claim 1, wherein the links at opposite ends of each shoe are of equal length and appreciably longer than necessary for movement of the shoes into engagement with the peripheral wall of the drum, the links extending annularly inclined in the direction of rotation of the flange, whereby the shoes upon frictional engagement with the peripheral wall are adapted to be wedged into tighter engagement.

CLIFFORD V. ZIEG, Jr.

REFERENCES CITED

The following references are of record in the file of this patent:

UNITED STATES PATENTS

| Number | Name | Date |
|---|---|---|
| 715,418 | Parsons | Dec. 9, 1902 |
| 748,016 | Roberts | Dec. 29, 1903 |
| 1,210,150 | Clark | Dec. 26, 1916 |
| 1,587,410 | Pepin | June 1, 1926 |
| 1,823,881 | Ackerman et al. | Sept. 22, 1931 |
| 1,972,643 | Chapman | Sept. 4, 1934 |
| 2,038,450 | Roesch | Apr. 21, 1936 |
| 2,392,950 | Russell | Jan. 15, 1946 |

FOREIGN PATENTS

| Number | Country | Date |
|---|---|---|
| 520,151 | Great Britain | Apr. 16, 1940 |
| 522,321 | Great Britain | June 14, 1940 |